Nov. 26, 1935.  G. R. TOWNSEND  2,022,529
PACKING GLAND
Filed Feb. 17, 1934
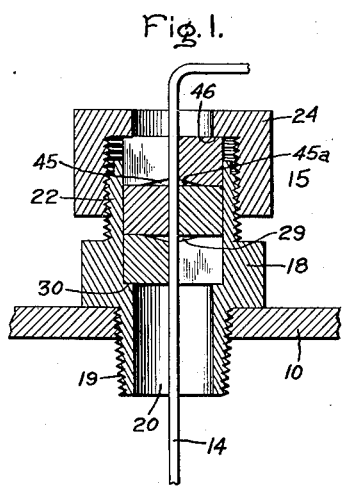
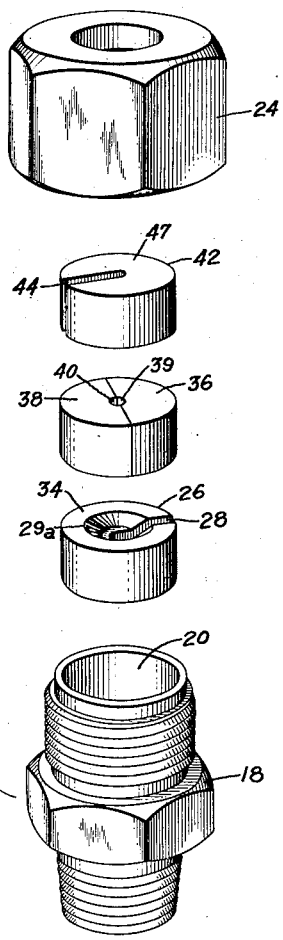
Inventor:
George R. Townsend,
by Harry E. Dunham
His Attorney.

Patented Nov. 26, 1935

2,022,529

UNITED STATES PATENT OFFICE 2,022,529

PACKING GLAND

George R. Townsend, Schenectady, N. Y., assignor to General Electric Company, a corporation of New York Application February 17, 1934, Serial No. 711,641

5 Claims. (Cl. 285—122)

My invention relates to packing glands of the type arranged to form an air-tight seal about a pipe or conduit, more particularly to packing glands for air-tightly supporting relatively thin pipes in the side walls of a tank, and has for an object the provision of a simple, inexpensive packing gland constructed so as to protect the pipe from collapse.

At the present time expansible bellows, operated by means of a volatile fluid, are quite satisfactory for the operation of thermostatic switches or similar circuit-controlling apparatus. The volatile fluid is ordinarily placed in a bulb which is connected by a capillary tube having relatively thin walls to the expansible bellows. As applied to a hot water tank, it is often desirable to place the bulb on the inside of the tank and to provide an air-tight packing gland for the tube which extends through the wall of the water tank to the thermostat. Ordinarily, a considerable amount of pressure must be applied to the gland to insure a sufficiently tight seal between the tube and the wall of the water tank. However, if this pressure is increased above a predetermined amount there is danger of collapsing the capillary tube. It is, therefore, a further object of my invention to provide a packing gland which automatically limits the pressure which can be applied to the walls of the capillary tube.

In carrying out my invention in one form thereof, I provide a bushing through which the capillary tube extends, the bushing being arranged to receive a pair of brass collars between which is located a lead collar. By means of a lock-nut the brass collars are forced into engagement with the lead collar, causing the lead to flow into intimate engagement with the capillary tube and against the wall of the bushing to form an air-tight seal. The brass collars are provided with slots of such dimensions that the maximum amount of pressure which can be exerted on the capillary tube is limited by the tendency of the metal to flow into the slots rather than to cause the capillary tube to collapse.

For a more complete understanding of my invention, reference should now be had to the accompanying drawing wherein I have shown in Fig. 1 a sectional elevation of a packing gland embodying my invention, while in Fig. 2 I have shown an exploded perspective view of the packing gland shown in Fig. 1.

Referring to the drawing, I have shown my invention in one form as applied to a hot water tank, only a portion of the wall 10 of the tank being shown. A bulb 12 filled with a volatile or expansible fluid, such for example as alcohol, is placed within the hot water tank, a thin-walled pipe or capillary tube 14 extending from the bulb 12 through the packing gland 15 to a thermostatic switch (not shown) operable by an expansible bellows. Thermostatic switches of the type utilizing expansible liquids are well known to those skilled in the art, one suitable type of thermostatic switch being described and claimed in U. S. Letters Patent No. 1,825,591—Hutt—dated September 29, 1931.

The packing gland 15 consists of a bushing 18 having one end 19 arranged in screw-threaded relationship with the wall 10, an opening 20 somewhat larger than the bulb 12 being provided through the center of the bushing 18 so that the bulb 12 can be easily inserted or removed through the opening 20.

In assembling the packing gland the bushing 18 is tightly screwed into the wall 10, the bulb then being inserted through the opening 20 (Fig. 2) and adjusted to the desired position. A rigid brass collar 26 provided with a slot 28 and a recess 29 is then dropped into the opening 20, the capillary tube 14 extending through the central portion of the slot 28. The collar 26 is supported in position by means of an annular shoulder 30 provided on the inner wall of the bushing 18. It will be observed that the width of the recess 29 is less than the diameter of the brass collar 26 so that a peripheral bearing surface 34 is provided on its upper face adjacent the recess to support a pair of semi-circular lead collars 36 and 38. The lead collars are respectively provided with semi-circular openings 39 and 40 at their centers which form a hole of the same size as the capillary tube 14.

Preferably, the lead collars 36 and 38 are assembled within the bushing so that the adjoining central portions of the collars lie at right angles to the slot 28 provided in the brass collar 26. A second brass collar 42, identical in construction with the collar 26 and provided with a slot 44 and a recess 45, is then placed on the capillary tube 14 with the slot extending at right angles to the adjoining portions of the lead collars 36 and 38. The assembly is then completed by screwing a lock-nut 24 into the upper portion 22 of the bushing 18, the lock-nut being provided with a shoulder 46 arranged to strike against the upper face 47 of the collar 42.

As the lock-nut 24 moves downwardly its shoulder 46 bears against the rigid brass collar 42 to build up pressure on the assembly. As soon as this pressure is increased sufficiently, the lead collars are deformed by the flow of metal into the recesses 29 and 45 formed in the respective brass collars 26 and 42. The inclined surfaces 29a and 45a of the recesses assist in guiding the flow of metal against the thin-walled pipe or capillary tube. The metal also flows against the inner wall of the bushing 18 to form an air-tight packing gland for the tube 14 and thereby prevent the escape of liquid through the gland. If the pressure is further increased by the nut 24, the increase of pressure on the tube 19 is limited by the flow of the lead into the radial slots 28 and 44.

If the passageways formed by the slots were not provided, it would be possible to build up sufficient pressure to collapse the capillary tube 14. Since the amount of pressure exerted on the tube 24 is a function of the turning effort applied to the nut 24, the advantage of automatically preventing deformation or collapse of the tube will be apparent when it is remembered that unskilled persons may assemble the packing gland 15 by applying a turning effort to the nut 24 far in excess of that required to secure an air-tight seal.

While I have shown a particular embodiment of my invention, it will be understood, of course, that I do not wish to be limited thereto since the collars 26 and 42 may be formed from any rigid material capable of withstanding high compressive forces while the collars 36 and 38 may be formed of any material capable of flowing when subjected to pressure. I, therefore, contemplate by the appended claims to cover any such modifications as fall within the true spirit and scope of my invention.

What I claim as new and desire to secure by Letters Patent of the United States is:

1. A packing gland for a thin-walled pipe comprising a plurality of rigid collars each being provided with a slot, a deformable collar between said rigid collars formed of material having the property of flowing when a predetermined pressure is applied thereto, a bushing through which said pipe extends, said deformable collar cooperating with said bushing to center the pipe in said bushing, and a fastening means for producing sufficient pressure on said deformable collar to cause the material forming it to flow against said pipe and said bushing to form an air-tight seal, the slots in said collars being arranged to receive a sufficient flow of said material to limit to a predetermined amount the pressure applied against said pipe by the flow of said material.

2. A packing gland for a thin walled pipe comprising a plurality of rigid collars each being provided with a slot, a pair of semi-circular members forming a collar between said rigid collars, each of said members being provided with an axial semi-circular slot at its center to form a central opening between them for said pipe, said semi-circular members being formed of material having the property of flowing when a predetermined pressure is applied thereto, a bushing through which said pipe extends, said semi-circular members cooperating with said bushing to center the pipe in said bushing, and a fastening means for producing sufficient pressure on said members to cause the material forming them to flow against said pipe and said bushing to form an air-tight seal, the slots in said collars being sufficiently large to receive the flow of said material so as to limit the pressure applied against said pipe by the flow of said material.

3. A packing gland for a thin-walled pipe comprising a pair of rigid collars, each of said collars being provided with a slot extending radially from its center and with a central recess in one face forming a peripheral bearing surface, a deformable collar formed of material capable of flowing under pressure between said rigid collars, said collars being arranged with said bearing surfaces in engagement with said deformable collar, a bushing provided with an opening for receiving said pipe and said collars in the order named, said bushing being provided with a shoulder against which one of said rigid collars rests, and means operable against said other rigid collar for forcing said collars together until sufficient pressure is applied by said bearing surfaces to said deformable collar to cause the material of said deformable collar to flow into said recesses and against said pipe and bushing to form thereby an air-tight seal for said pipe, said slots forming outlet passageways for the flow of said material so as to limit the pressure applied to said pipe sufficiently to prevent deformation of said pipe.

4. A packing gland for a thin-walled pipe comprising a bushing, a pair of brass collars provided with slots for receiving said pipe, semi-annular lead members forming a collar between said brass collars and provided with an opening for said pipe, said bushing being provided with an opening for receiving said collars, and a lock-nut for said bushing for forcing said collars together until the pressure created causes the metal of said lead collars to flow against said pipe and bushing to form an air-tight seal, said slots in said brass collars serving as relief passageways for preventing the building up of more than a predetermined pressure against the tube.

5. A packing gland for a thin-walled capillary tube connected to a bulb comprising a bushing provided with an opening sufficiently large to permit the movement of the bulb therethrough, an annular shoulder within said opening, a brass collar one face of which engages said shoulder, said collar being provided with a radial slot and an axial recess on the other face thereof providing a peripheral bearing surface, a pair of semi-circular members formed of lead for centering said tube in said slot and said bushing, said semi-circular members being adjacent said peripheral bearing surface, a second brass collar provided with a radial slot and an axial recess in one face thereof said recess providing a peripheral bearing surface adjacent the opposite face of said semi-circular members, and a nut provided for said bushing for cooperating with said shoulder to force said collars together, whereby sufficient pressure is exerted by said peripheral bearing surfaces to cause said lead to flow into said recesses against said tube and against said bushing to form an air-tight seal, said radial slots forming outlet passageways for the flow of said lead to limit the pressure applied to said tube to a predetermined value so as to prevent deformation of said capillary tube.

GEORGE R. TOWNSEND.